United States Patent
Ritter et al.

[11] 3,708,646
[45] Jan. 2, 1973

[54] ELECTRIC RESISTANCE WELDING MACHINE

[75] Inventors: Klaus Ritter; Hans Gott; Josef Ritter; Gerhard Ritter, all of Graz, Austria

[73] Assignee: EVG Entwicklungs- und Verwertungsgesellschaft m.b.H., Graz, Austria

[22] Filed: March 22, 1971

[21] Appl. No.: 126,561

[30] Foreign Application Priority Data

March 25, 1970 Austria..........................2799/70

[52] U.S. Cl......................................219/56, 219/78
[51] Int. Cl. ...........................................B23k 11/00
[58] Field of Search..........................219/56, 78–82, 219/86–88

[56] References Cited

UNITED STATES PATENTS 1,097,895  5/1914  Thomson.............................219/87
1,465,241  8/1923  Townsend............................219/87

Primary Examiner—C. L. Albritton
Attorney—Ernest F. Marmorek

[57] ABSTRACT

A machine for the intermittent electric resistance welding of a workpiece which advances continuously during the welding process between one or more pairs of welding electrodes. Of the two electrodes forming each pair at least one is mounted on a drive shaft extending parallel to the surface of an advancing workpiece perpendicular to its direction of advance. This electrode has two or more electric contact surfaces for application to the workpiece spaced apart equiangularly around the periphery of the electrode. The drive shaft is driven through a gear system which gives the drive shaft a complex rotational movement whereby each working contact surface of the electrode follows the trochoidal path including a substantially straight part alongside the path of advancement of the workpiece. Welding takes place at each contact surface while the contact surface is moving along this part of its trochoidal path in contact with the workpiece.

8 Claims, 7 Drawing Figures

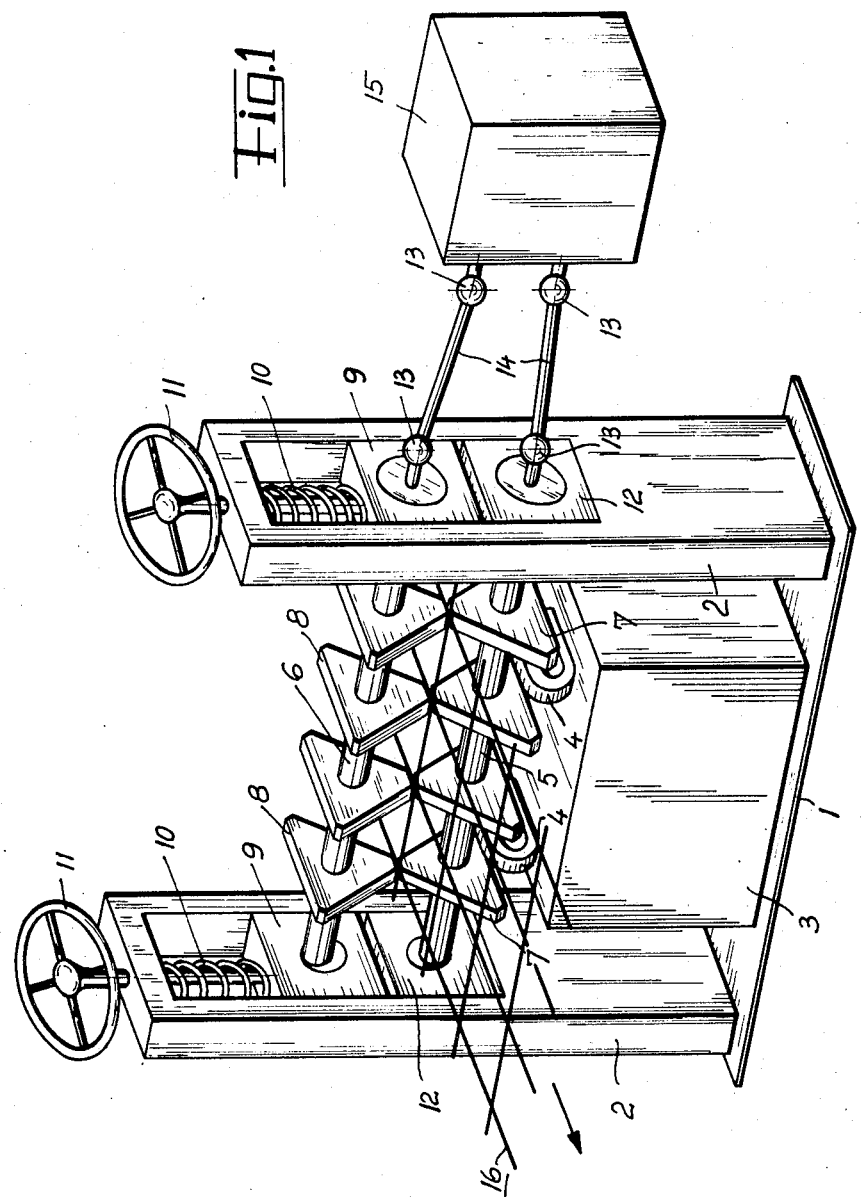

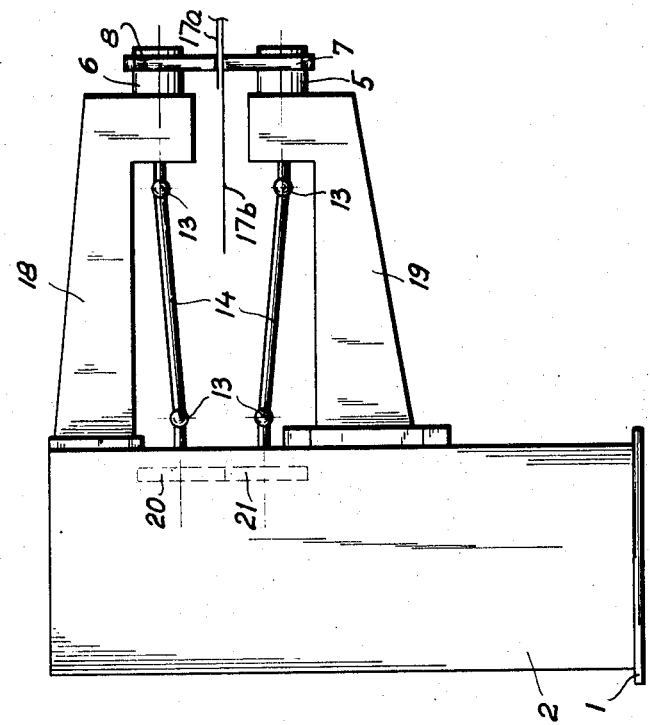
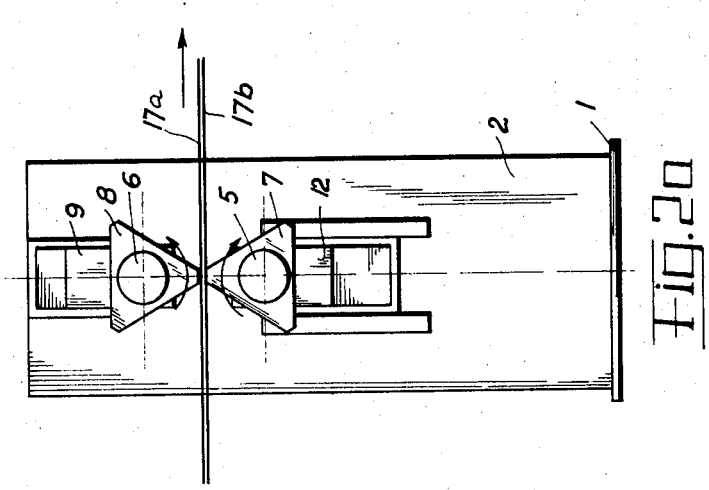

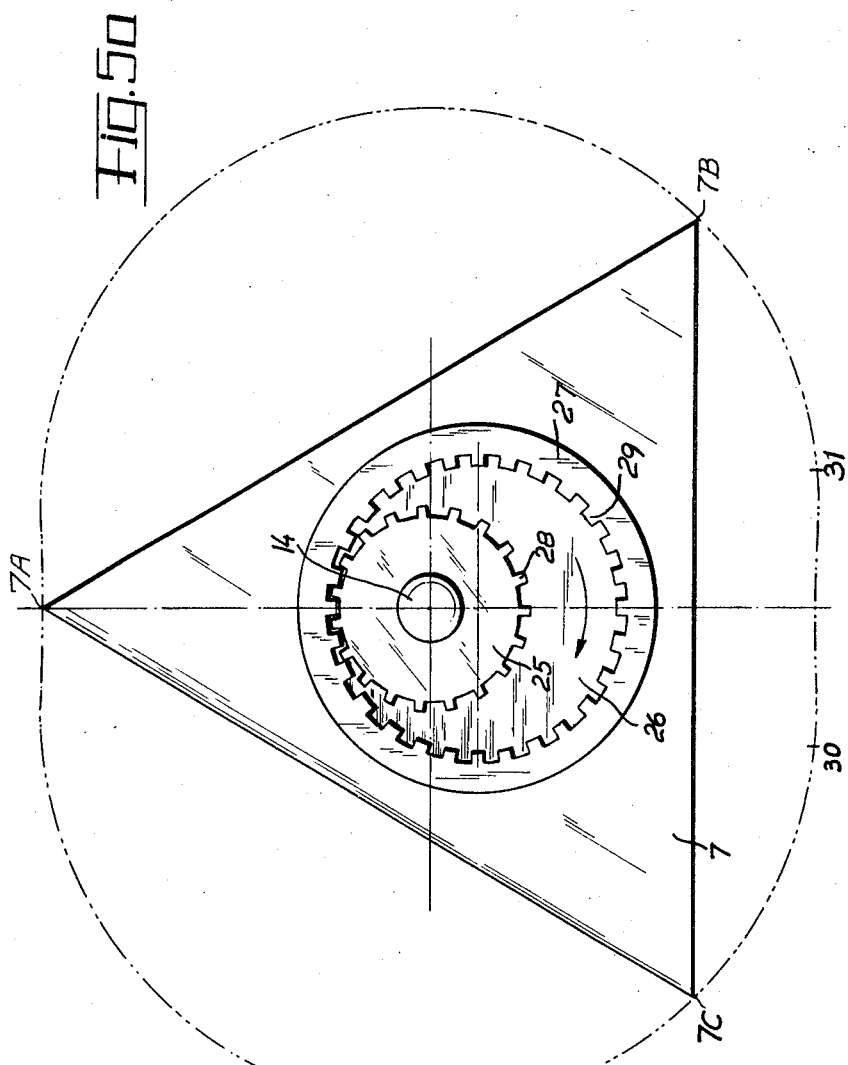

ELECTRIC RESISTANCE WELDING MACHINE

In known multipoint welding machines one or more rows of active electrodes are positioned opposite a corresponding number of active electrodes, or of passive current bridges, the electrodes and counter electrodes, or current bridges, being positioned symmetrically on opposite sides of the workpiece plane, that is to say they are opposite each other on opposite sides of the plane in which the workpiece is conveyed through the machine. Typical examples of machines of this kind are the automatic welding machines used for manufacturing welded wire mesh.

In these known machines the workpiece is fed stepwise through the machine. During the period when the workpiece is at a standstill the counter electrodes, or current bridges, are thrust against the surface of the workpiece, so that the workpiece is firmly clamped between the electrodes and the counter electrodes, or current bridges, whereupon the welding current is switched on, and continues flowing during a specified period. After the current has been switched off the counter electrodes, or current bridges, are lifted away from the workpiece, which is then advanced a further step through the machine. When this step of advance has been completed, a fresh working cycle begins.

The working speed of a machine of this kind, that is to say the average linear speed of advance of the workpiece through the machine, all through the working cycle, and consequently the throughput of the machine, is limited, for two reasons. In the first place the workpiece remains stationary in the machine during the welding process proper, that is to say while current is flowing. Secondly, during the periods when the workpiece is advancing, between welding periods, its linear speed through the machine is limited by inertia. The workpiece first has to be accelerated from a standstill, and subsequently has to be decelerated and brought to a standstill again. The masses involved consist not only of the mass of the workpiece itself, but also include the masses of all the parts of the machine which have to be accelerated and decelerated.

In order to obtain a higher average linear speed of the workpiece, and therefore a higher rate of throughput, it has been proposed to construct machines through which the workpiece advances continuously, at constant speed, the workpiece passing between roller electrodes, for effecting the welding. In a machine of this kind there are no masses which have to be accelerated and decelerated. However, this proposed method cannot in reality provide a higher throughput. This is because, in a mesh welding machine, for example, welding current can flow only during the limited period when the workpiece is firmly clamped, at the wire crossing points, between the pairs of roller electrodes. This period must be long enough to give a good weld. The length of the welding period depends on the diameters of the workpiece wires. Thicker wires require a longer welding period. Assuming that a workpiece wire mesh is advancing at a given constant speed through the machine, the welding period available is limited by the distance travelled by the wire crossing point while it is clamped firmly between the electrodes. This distance is determined by the mechanical dimension of the machine parts, in particular by the diameters of the roller electrodes and by their spring travel perpendicular to the workpiece plane. Consequently in a machine of given construction the constant linear speed of advance of the workpiece through the machine is limited by the fact that each wire crossing point must remain clamped between the electrode long enough to give a good weld.

In a welding machine for intermittently welding wire mesh, in which the workpiece advances at constant speed, this speed remaining constant both during the welding period and during the intermediate periods between successive welding periods, the constant linear speed of the workpiece, and consequently the throughput of the machine, is therefore limited by the welding distance, that is to say the distance through which the wire crossing point travels while the welding current is passing. This distance depends on the workpiece wire diameter.

The object of the present invention is to provide a welding machine, for intermittent electric resistance welding, mainly for welding wire mesh but which may also be intended to be used for other purposes, in which the workpiece advances continuously at constant speed, between the pairs of electrodes, the machine being constructed so as to allow the workpiece to be advanced at a considerably higher linear speed through the welding stetch, compared to what has hitherto been possible, using the known machines.

The problem is solved according to the invention in that of the two electrodes forming the or each pair at least one is mounted on a drive shaft extending parallel to the surface of an advancing workpiece perpendicular to its direction of advance, the electrode having two or more electric contact surfaces, for application to the workpiece, spaced apart equiangularly around the periphery of the electrode, the drive shaft being driven through a gear system which gives the drive shaft a complex rotational movement during which it rotates about its own axis and simultaneously orbits about a stationary axis extending parallel to the drive shaft axis, the rotational and orbiting movements combining together so that each working contact surface of the electride follows a trochoidal path including a substantially straight part alongside the path of advance of the workpiece.

A machine constructed in this way retains the same advantages as the known roller electrode machine, compared to machines in which the workpiece is advanced intermittently, in particular a simpler mechanical construction and reduced weight, due to the fact that there rare no masses which have are accelerate and decelerate. However, compared to the known roller electrode machine, the new machine can be operated to give a considerably higher rate of throughput.

The machine can if desired be constructed in such a way that the electrodes of the or each pair are mounted on two drive shafts disposed on opposite sides of the plane of the advancing workpiece, the contact surfaces of the two electrodes of the or each electrode pair following trochoidal paths arranged symmetrically to form mirror images of each other across the plane.

Alternatively the machine can be constructed in a simpler way, in that only one electrode of the or each pair is rotary and is mounted on a drive shaft situated on one side of the workpiece plane, the other complementary electrode, on the other side of the workpiece plane, being in the form of a stationary friction contact. The counter electrodes are preferably spring loaded, and can if necessary be cooled.

For those applications in which only a single row of welds is made, for example when lap welding together metal strip, the construction of a machine according to the invention can be simplified by mounting only one electrode on each drive shaft. For multipoint welding, on the other hand, and in particular for spot welding wire mesh, several electrodes are mounted coaxial on each drive shaft.

The machine may have two electrode drive shafts, or two pairs of electrode drive shafts, the spacing between the drive shafts or drive shaft pairs in the direction of advance of the workpiece, and their phase relationships, being chosen so that the welds made by the one electrode or electrode pair mounted on the one drive shaft or drive shaft pair are spaced at a predetermined distance from the welds made by the electrode or electrode pair mounted on the other drive shaft or drive shaft pair. This arrangement, in which several electrode shafts are mounted the one behind the other, in the direction of the workpiece advance, can be developed, by using a sufficiently great number of electrode shafts, to give a machine which makes a continuous weld seam, consisting of closely spaced spot welds. Furthermore a machine of this kind can if desired be so constructed that the electrode pairs themselves drag the workpiece along, advancing it continuously at constant speed through the machine, no other conveying means being required.

Some examples of machines constructed in accordance with the invention are illustrated in the accompanying drawings, in which:

FIG. 1 is an axonometric representation of a multipoint electric resistance welding machine for manufacturing welded wire mesh. Omitted from the figure are all those parts, for example the feeding and conveying devices for the longitudinal and transverse wires, which are not necessary for explaining the nature of the present invention;

FIGS. 2a and 2b represent, in front and in side elevation, a machine for the series spot welding of metal strip;

Figure 4:
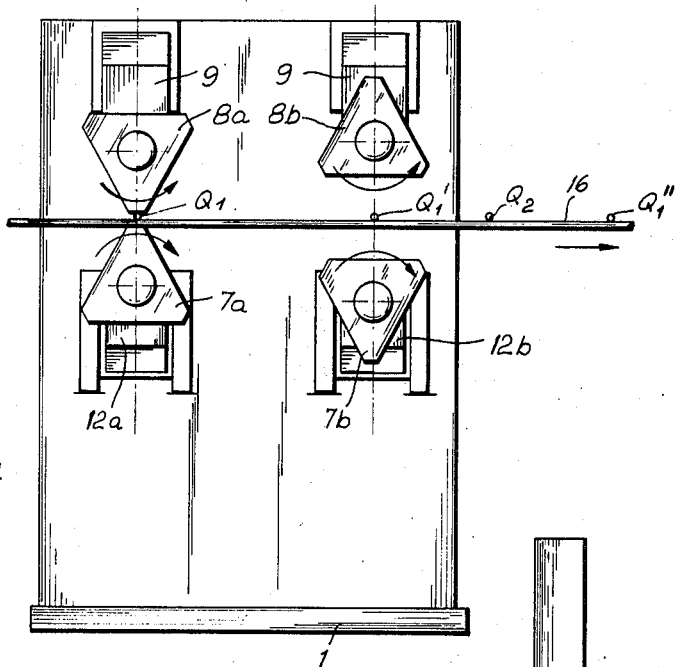
Figure 5B:
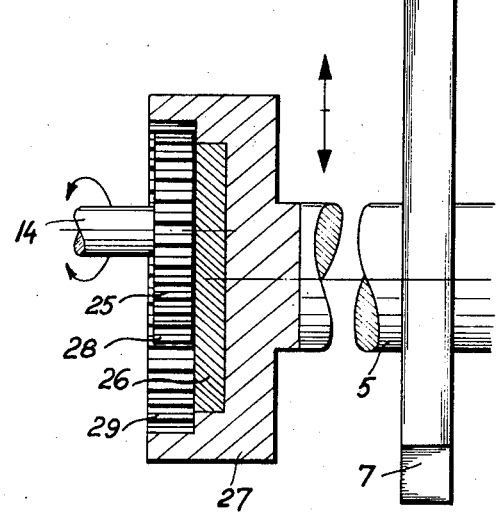

FIG. 4 is a side view of a mesh welding machine with two pairs of electrodes situated the one behind the other in the direction of advance of the wire mesh; and, FIGS. 5a and 5b represent, in front elevation and as a partly sectioned side view, a drive system which converts the rotary movement of a drive shaft into noncircular movements of the contact surfaces of an electrode body mounted on the end of the shaft, the contact surfaces following a trochoidal path.

The machine in FIG. 1 consists of a base plate 1 and two side frames 2, these three parts together forming the machine frame. The side frames 2 have openings. Mounted on the base plate 1, between the two side frames 2, there is a housing 3 for accommodating the welding transformers. Extending right across the machine, between the two side frames 2, there are two drive shafts 5, 6, each supporting four triangular electrodes 7, 8. Each electrode has flattened corners, which act as contact surfaces when the machine is in operation. The lower drive shaft 5 receives power from the secondary windings of the transformers over flexible conductor leads 4. The upper drive shaft 6 receives electric power from the transformers over leads, situated at the feed side of the machine, which are not shown in FIG. 1. Alternatively, only the lower drive shaft 5 could be connected electrically to the secondary windings of the welding transformers, the upper drive shaft 6 being arranged so that the triangular electrodes mounted on this shaft act in pairs as passive current bridges.

The two drive shafts 5, 6 are mounted so that they rotate, at their two ends, in gearboxes 9, 12, which will be described in greater detail further below. Each lower gearbox 12 is fixed in the opening in a side frame 2. The upper gearbox 9 is mounted adjustable in height in the opening and is spring loaded downwards by a compression spring 10, the downward thrust of which is adjustable by means of a handwheel 11. This arrangement ensures that the upper electrodes 8 thrust downwards against the surface of the workpiece with the desired amount of thrust, which is adjustable by means of the handwheels 11. The two drive shafts 5, 6 are driven by the motor 15 through flexible, universally jointed drive shafts 14, and through the gearboxes 9, 12.

When the machine is in operation, wire mesh 16 emerges continuously from the machine, in the direction of the arrow, propelled by means not shown, the grating passing between the pairs of electrodes 7, 8, which weld the wires together at their cross-over points, producing a welded crossed wire mesh as indicated in the figure.

As will be described in greater detail later, the two drive shafts 5 and 6 perform complex rotational movements so that each contact surface, formed by a flattened corner of the electrode, follows a trochoidal path, one of whose flat parts, or almost flat parts, coincides at least approximately with the plane of the mesh 16, so that over this stretch, that is to say the almost flat part of the trochoidal path, the workpiece is subjected continuously to the welding pressure between the electrodes 7 and 8, electric current flowing continuously to make the weld. The sustained nature of the welding process allows the workpiece to be advanced through the machine at a considerably higher linear speed, compared to what can be obtained using the customary roller electrodes. Consequently welded mesh 16 is produced at a considerably higher rate of output.

FIGS. 2a and 2b show front and side elevations of a machine for joining together two metal strips 17a, 17b by sequential spot welding. In this machine of the two drive shafts 5 and 6 each supports only one triangular electrode 7, 8. As shown in FIG. 2b, the two electrodes 7 and 8, on the right, are driven by articulated drive shafts 14 through gearboxes mounted in the outer ends of supporting booms 18, 19, so as to give plenty of room for manipulating the two pieces of strip 17a, 17b. The articulated drive shafts 14 are driven by intermeshing gearwheels 20, 21, so that the articulated shafts 14 rotate synchronously in opposite directions. It should be observed that this machine, represented in FIGS. 2a and 2b, can be used for manufacturing the concrete reinforcement material, known commercially under the name "Bi-Steel" and forming the subject of our British Pat. No. 728,866, that is to say for welding the transverse rungs between the two parallel longitudinal wires. In this case the two drive shafts 5 and 6 are set a greater distance apart. The transverse rungs are introduced vertically between the counter-rotating electrodes 7, 8, which thrust the longitudinal workpiece wires firmly against the ends of the transverse rungs, electric current passing in series over the two wire junctions, at the two ends of each transverse rung, forming the two welds.

Figure 3:
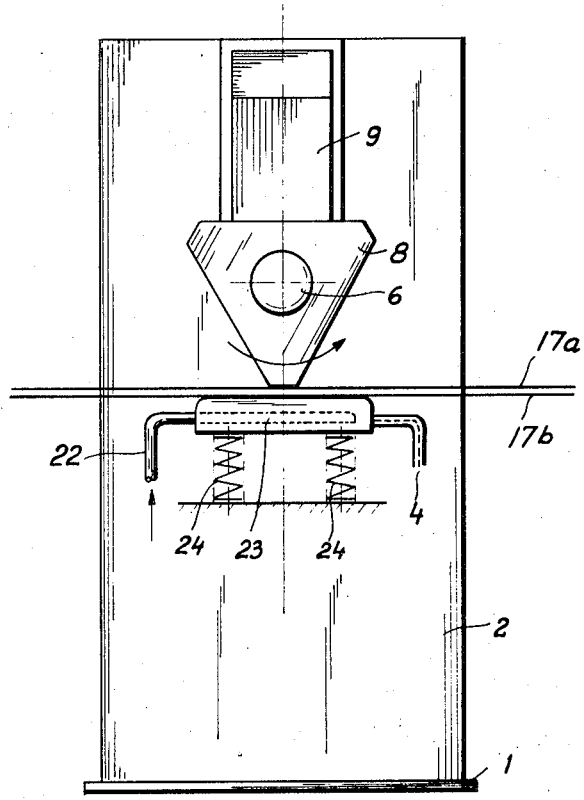
FIG. 3 shows a machine of the kind shown in FIG. 1, but in this case the lower electrodes are constructed as friction contacts.

The FIG. 3 machine differs from the machine shown in FIG. 2 in that it has only one triangular, rotating electrode 8. The other electrode is in the form of a friction contact 23 which is thrust resiliently against the surface of the workpiece by springs 24.

Current is fed to the friction contact 23 over a flexible conductor 4. A pipe 22 supplies cooling liquid. The machine can have a number of triangular electrodes 8 mounted concentrically along the drive shaft 6, the triangular electrodes cooperating with a corresponding number of counter electrodes 23. Arranged in this way the machine can be used for multipoint welding, particularly for welding wire mesh.

The machine shown in FIG. 4 is a compound machine which can be regarded as made up by assembling together two machines of the kind described above. This machine allows welding points to be grouped closer together, along the length of the workpiece. The spacing of the welds is determined by the distance between the two pairs of electrodes 7a, 8a and 7b, 8b, and by the phase relationship between the two pairs of drive shafts 5a, 6a and 5b, 6b. In the example shown the distance between two welds is halved by duplicating the machine in this way.

In FIG. 4 the welds made by the first pair of rotating electrodes 7a and 8a are represented at $Q_1, Q'_1, Q''_1$... . It should be observed that the spacing of these welds along the workpiece is determined by the dimensions of the rotating electrodes, and by the number of contact surfaces on each electrode. In this example each electrode, being triangular, has three contact surfaces. Assuming that the two pairs of electrodes are positioned a given distance apart, the phase relationship between the two pairs of drive shafts can be chosen so that the second pair of electrodes makes welds exactly half way between those made by the first pair, as indicated at $Q_2$. In this machine, which has two pairs of electrodes, the spacing between the welds is therefore halved. In general, in a machine having several pairs of electrodes, acting in series with one pair behind another, the distance between welds is decreased in the ratio of the number of electrode pairs, so that finally a machine equipped with a large number of electrode pairs can produce, if desired, a practically continuous weld.

In a machine equipped with a large number of counter-rotating electrode pairs the electrodes themselves can if desired be used for coveying the workpiece material longitudinally through the machine.

FIGS. 5a and 5b represent, in front elevation and as a partly sectioned side elevation, the drive system for the rotary electrodes. This drive system, which is in itself known, imparts to each electrode a complex rotary movement of such a nature that each contact surface 7A, 7B, 7C of the electrode follows a trochoidal path.

A driving shaft 14, driven by a motor, passes through a stationary gearwheel 25, which is equipped with external teeth 28. Fixed to the end of the driving shaft 14 there is an eccentric disc 26 which works in a central, circular recess in a rotor 27, which has internal teeth 29 engaging with the external teeth 28 of the stationary gearwheel 25. Fixed to the rotor 27 is the driven shaft 5 on which are fixed the electrodes 7. There can be any number of electrodes, arranged in any desired way.

Rotation of the driving shaft 14 is transmitted, through the eccentric disc 26, to the rotor 27, imparting to it the complex rotary movement mentioned above. It should be observed that the ratio of the internal diameter of the rotor 27 to the external diameter of the stationary gearwheel 25 must be $n : (n-1)$ where n is the number of contact surfaces on each electrode. In the present example, using a triangular electrode, with three contact surfaces, the ratio is therefore 3 : 2.

When the machine is in operation, the driving shaft 14 rotating, let it be assumed, in the directions of the arrows in FIGS. 5a and 5b, the gearwheel 25 remaining stationary, the rotor 27, propelled by the eccentric disc 26, performs a rolling movement, rolling around the stationary gearwheel 25, its internal teeth 29 engaging with the external teeth 28 of the stationary gearwheel 25, the rotor 27 being simultaneously induced by the eccentric disc to perform a wobbling movement, resulting in the contact surfaces following a trochoidal path.

The rotor 27 therefore performs a complex movement composed, on the one hand, of an orbital rotation of its axis about the axis of the stationary gearwheel 25, this orbital rotation being combined with a simultaneous rotation of the rotor 27 about its own axis. The rate of rotation of the rotor 27 about its own axis is the algebraic difference between two quantities. The first of these quantities is the rate of rotation of the driving shaft 14. The second quantity is the rate of rotation of the driving shaft 14 reduced by the ratio, in this case the ratio 2 : 3, of the number of teeth 28 to the number of teeth 29. In the present example a rotation of the driving shaft 14 through 360° produces a rotation of the rotor 27 about its own axis through the angle 360 (1⅔) = 120°. During this movement, that is to say while the driving shaft 14 is rotating through 360°, the contact surface 7A comes around into the position 7B, the three contact surface 7A, 7B, 7C finally adopting the new positions represented in FIG. 5a at 7B, 7C, 7A.

It will be observed that the trochoidal path represented in FIG. 5a is almost straight between the points 31 and 30. Consequently welding can be done while the workpiece is moving along this entire stretch, between 31 and 30, in contact with the electrode. Even though the workpiece is travelling relatively fast through the machine, there is nevertheless sufficient welding time available for a good weld to be obtained.

Other drive systems can of course be used if desired, provided that the drive system used is capable of deriving, from a simple rotation a movement of the electrode contact surfaces along a trochoidal path.

We claim:

1. A machine for the intermittent electric resistance welding of a work piece which advances continuously during the welding process between at least one pair of welding electrodes, said machine comprising a drive shaft extending parallel to said work piece surface and perpendicular to the direction of advance of said work piece, means mounting at least one electrode of each of said electrode pairs on said drive shaft, said one electrode having at least two electric contact surfaces for application to said work piece, said contact surfaces being spaced apart equi-angularly around the periphery of said one electrode, means driving said drive shaft whereby said drive shaft is given a complex rotational movement during which it rotates about its own axis and simultaneously orbits about a stationary axis extending parallel to said drive shaft axis, said rotational and orbiting movements combining together so that each of said contact surfaces of said electrodes follows a trochoidal path including a substantially straight part alongside the path of advance of said work piece.

2. A machine according to claim 1, further comprising at least one additional drive shaft extending parallel to said work piece surface and perpendicular to the direction of advance of said work piece.

3. A machine according to claim 1, wherein said means driving said electrode drive shaft comprises a first toothed wheel having internal teeth and mounted coaxially on said driven shaft, means forming a circular coaxial recess in said toothed wheel, a circular disc rotating in said recess, driving shaft connected eccentrically to said circular disc and rotating in fixed bearings, and a second toothed wheel mounted coaxially on said driving shaft and having external teeth engaging with said internal teeth of said first toothed wheel, the pitch circle diameters of said toothed wheels being in the ratio $n:(n-1)$, where n is the number of equally spaced contact surfaces of each electrode on said shaft.

4. A machine according to claim 2, wherein said electrodes of each pair are mounted on two of said drive shafts disposed on opposite sides of the plane of said advancing workpiece, said contact surfaces of said two electrodes of each electrode pair following trochoidal paths arranged symmetrically to form mirror images of each other across said plane.

5. A machine according to claim 2, wherein only one of said electrodes of each pair is rotary and is mounted on one of said drive shafts situated on one side of the plane of said work piece, the other of said electrodes on the other side of said plane, being in the form of a stationary friction contact.

6. A machine according to claim 2, wherein only one electrode is mounted on each of said drive shafts.

7. A machine according to claim 2, wherein several electrodes are mounted coaxially on each of said drive shafts.

8. A machine according to claim 2, wherein there are two pairs of said electrode drive shafts, the spacing between said drive shaft pairs in the direction of advance of said workpiece, and their phase relationships, being selected so that the welds made by the electrode pair mounted on said one drive shaft pair are spaced at a predetermined distance from the welds made by the electrode pair mounted on said other drive shaft pair.

* * * * *